United States Patent Office 3,658,805
Patented Apr. 25, 1972

3,658,805
CYCLIC NITRILE OXALATE COMPOUNDS
Emmett H. Burk, Jr., Glenwood, Ill., and Donald D. Carlos, Crown Point, Ind., assignors to Atlantic Richfield Company
No Drawing. Filed Nov. 7, 1966, Ser. No. 592,339
Int. Cl. C07d 87/00, 87/02
U.S. Cl. 260—246 R
18 Claims

ABSTRACT OF THE DISCLOSURE

Cyclic nitrile oxalate compounds having the structure

wherin A is an aliphatic (including cyclo-alphatic) or an aromatic hydrocarbon radical, and $n$ is an integer of 0 to 3, preferably 1 to 2, are disclosed. The compounds are useful as, inter alia, isocyanate generators and have the advantage that, unlike conventional isocyanates, they can be easily handled and stored.

---

The present invention is directed to a new class of organic compounds. More specifically, the invention is directed to cyclic nitrile oxalate adducts, including aliphatic and aromatic, mono- and polynitrile oxalates. The polynitrile oxalate adducts of the invention further include dinitrile oxalates. The new class of organic compounds of the invention can be represented by the following structure:

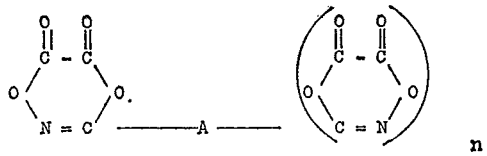

wherein A is an aliphatic (including cyclo-aliphatic) or an aromatic hydrocarbon radical, and $n$ is an integer of 0 to 3, preferably 1 to 2.

When A is an aliphatic hydrocarbon radical, it may contain 1 to about 50 carbon atoms, preferably about 1 to 30 carbon atoms, and can be saturated or unsaturated, straight or branched chain. If desired it can also be substituted with noninterfering groups, as, for instance, with aromatic substituents. When A is an aliphatic hydrocarbon radical and $n$ is equal to zero, A is monovalent and is preferably alkyl, including cycloalkyl. When A is an alpihatic hydrocarbon radical and $n$ is greater than zero, A is divalent and is preferably alkyl or monoolefinic. Further, when A is an aliphatic hydrocarbon radical and $n$ is greater than zero, the nitrile oxalate groups may be attached to the same or different carbon atoms of the radical A but preferably the radical A contains a nitrile oxalate group on each end of the chain.

When A is an aromatic hydrocarbon radical it may contain 1 to 3 aromatic rings and often contains a total of 6 to about 30 or 50 carbon atoms or more, preferably 6 to 12 carbon atoms, and can also be substituted with noninterfering groups. When A is aromatic and $n$ is equal to zero, it preferably contains one aromatic ring. Further, the nitrile oxalate group is attached to one of the aromatic rings of the aromatic hydrocarbon A. When A is an aromatic hydrocarbon radical and $n$ is greater than zero, $n$ is preferably equal to 1, and at least two of the nitrile groups of the compounds of the present invention are attached to aromatic rings of the aromatic hydrocarbon A, and the nitrile oxalate groups may be attached to the same or different aromatic rings of the aromatic hydrocarbon A. Thus, the novel compounds of the invention include the mono and polynitrile oxalates of, for instance, benzene, toluene, vinylbenzene, divinylbenzene, naphthalene, anthracene, phenylbenzene, phenylnaphthalene, diphenylalkylenes such as diphenylmethylene, diphenylethylene (stilbene), etc., dinaphthylalkylene and like aromatic hydrocarbons.

The nitrile oxalates of the invention which contain at least one polymerizable >C=C< group may be polymerized to form homopolymers or copolymers with one or more other ethylenically unsaturated polymerizable monomers. Suitable ethylenically unsaturated monomers that may be used to form copolymers with the polymerizable nitrile oxalates of the invention are monomers which contain at least one polymerizable >C=C< group, usually a terminal ethylenic group (CH₂=C<), and include vinyl hydrocarbons such as isobutene, diisostyrenes, divinylbenzenes, etc., the acrylic type acids, nitriles, amides and esters; the allylic-type carboxylic esters and alcohols; the monovinylpyridines; n-vinyl pyrrolidone, vinylidine monomers; vinyl esters of halogen acids or of carboxylic acids; the alkyl vinyl ethers and the alkyl vinyl ketones.

The nitrile oxalates of the present invention are valuable intermediates or precursors for the preparation of highly desired chemicals. For example, the mono- and polynitrile oxalates can be thermally decomposed to mono- and polynitrile oxalates can be thermally decomposed to mono- and polyisocyanates. Isocyanates can be used in the preparation of urethanes, ureido compounds, and other derivatives of various active hydrogen compounds. The polyisocyanates, such as diisocyanates, have found extensive use in the preparation of high molecular weight polymers by reaction of the polyisocyanates with polymerizable organic compounds such as compounds with terminally active hydroxy and amine groups. Polyurethanes, for instance, are commonly prepared by the reaction of diisocyanates and polybasic alcohols such as the glycols. The nitrile oxalates can also be hydrolyzed with basic materials to the respective amines or acid hydrolyzed to the hydroxamic acids.

Decomposition of the nitrile oxalates to the corresponding isocyanates can be effected by simply heating the nitrile oxalates below the degradation point of the desired isocyanate product. Since the decomposition reaction is exothermic there is a tendency of the reaction temperature to run away. Means for carrying away or absorbing heat should be used, therefore, to control the temperature below the degradation point of the desired isocyanate product. The heating temperature employed will vary, of course, depending upon the decomposition temperature of the feed and degradation temperature of the particular isocyanates being prepared. In most cases, however, temperatures will usually fall in the range of about 50 to 200° C., preferably about 75 to 150° C. Advantageously, the decomposition is conducted in the presence of an inert solvent such as benzene, xylene, toluene, chlorobenzene and the like.

The ability of the nitrile oxalates of the invention to generate isocyanates upon heating provides an additional advantage to the consumer in that the nitrile oxalates of the invention, in contrast to isocyanates, are stable in the absence of water and therefore can be easily handled and stored. Also, since there is no active hydrogen (e.g. in the form of HCl) present in the nitrile oxalates of the invention or in the decomposition products formed, to react with the isocyanate when the latter is made, use of the nitrile oxalates for the production of isocyanates provides a method that does not suffer from the reduced yields and separation and purification problems presented by the by-products obtained from starting materials of commercial methods wherein active hydrogen is present. Use of the nitrile oxalates in the preparation of isocyanates, furthermore, provides a process having advantages over commercial methods employing azides in that the former do not have the explosion tendencies of the latter and are more economical.

The desired nitrile oxalates of the invention can be prepared by reacting the corresponding hydroxamic acid and oxalyl chloride. Hydroxamic acids which react with oxalyl chloride to produce the novel compounds of the invention can be represented by the structure:

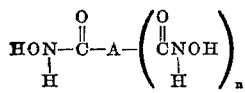

wherein A and N are as defined above in the structure of the nitrile oxalates of the invention and particularly, when aromatic polynitrile oxalates are desired, the hydroxamic acid groups are in a non-ortho-position on the aromatic ring. Thus, the aromatic mono- and polyhydroxamic acid reactants include, for instance, benzo mono- and polyhydroxamic acids, naphtho mono- and naphthopolyhydroxamic acids, anthromono- and anthropolyhydroxamic acids, phenylbenzomono- and phenylbenzopolyhydroxamic acid, diphenylalkylene mono- and diphenylalkylene polyhydroxamic acids and dinaphthylalkylene mono- and dinaphthylalkylene polyhydroxamic acids. When A, of the hydroxamic acid structure, is an aromatic hydrocarbon, it can be substituted, if desired, so long as the substituents do not inhibit formation of the nitrile oxalates of the invention.

Illustrative of aromatic polyhydroxamic acids suitable for use as the reactant in the preparation of the aromatic polynitrile oxalates of the invention are the following: benzodihydroxamic acids, such as isophthalodihydroxamic acid and terephthalodihydroxamic acid, benzotrihydroxamic acid, such as 1,3,5-benzenetrihydroxamic acid; benzotetrahydroxamic acid, such as pyromellitohydroxamic acid;
prehnitotetrahydroxamic acid;
1,4-dimethyl-2,5 benzodihydroxamic acid;
1,3-dimethyl-2,4-benzodihydroxamic acid;
2,3-dimethyl-1,5-benzodihydroxamic acid;
methylbenzodihydroxamic acid;
methylbenzotrihydroxamic acid;
ethylbenzodihydroxamic acid;
ethylbenzotrihydroxamic acid;
hexylbenzodihydroxamic acid;
hexylisophthalodihydroxamic acid;
nonylbenzodihydroxamic acid;
dodecylbenzotrihydroxamic acid;
pentadecylterephthalodihydroxamic acid;
pentadecylterephthalotrihydroxamic acid;
tricosylterephthalodihydroxamic acid;
tricosylterephthalotrihydroxamic acid;
1-benzyl-2,4-benzodihydroxamic acid;
2,8-naphthodihydroxamic acid;
1,3,5-naphthotrihydroxamic acid;
cyclohexylterephthalodihydroxamic acid;
tetrahydronaphthalodihydroxamic acid;
2,2-bis(p-phenylhydroxamic acid)propane;
bis(p-phenylhydroxamic acid)methane;
1-chloroisothalodihydroxamic acid;
4-bromo-1,3,5-trihydroxamic acid;
3-hydroxyterephthalodihydroxamic acid;
3-nitroterephthalodihydroxamic acid;
1-carboxyl-2,4-benzodihydroxamic acid;
2,8-anthracenetrihydroxamic acid;
4,4-biphenyldihydroxamic acid;
2,2¹-biphenyldihydroxamic acid;
4,4¹-diphenylethanedihydroxamic acid;
2,2¹-diphenylethanedihydroxamic acid;
4,4¹-stilbenedihydroxamic acid;
2,2¹-stilbenedihydroxamic acid.

Illustrative examples of aromatic polynitrile oxalates of the invention include those corresponding to the foregoing hydroxamic acids such as benzodinitrile oxalates preferably those wherein the nitrile oxalate groups are in the non-ortho position on the benzene ring, i.e. the meta - and - para - position, such as isophthalodinitrile oxalate and terephthalodinitrile oxalate; benzotrinitrile oxalate such as 1,3,5-benzotrinitrile oxalate, benzotetranitrile oxalate such as pyromellitotetranitrile oxalate and prehnitrotetranitrile oxalate;

2,4-dinitrile oxalate m-xylene;
2,5-dinitrile oxalate p-xylene;
1,4-dinitrile oxalate o-xylene;
2,4-dinitrile oxalate-1-methylbenzene;
2,4-dinitrile oxalate-1-methylbenzene;
1,3,5-trinitrile oxalate-2-ethylbenzene;
1,4-dinitrile oxalate-2-nonylbenzene;
2,4-dinitrile oxalate-6-tricosylbenzene;
2,4-dinitrile oxalate-3-hexylbenzene;
1,3,5-trinitrile oxalate-6-hexacosylbenzene;
1,3-dinitrile oxalate-5-benzylbenzene;
1-[2,4-dinitrile oxalate]-2-phenyl propane;
2,8-dinitrile oxalate napthalene;
1,3,5-trinitrile oxalate napthalene;
1,3-dinitrile oxalate tetrahydronaphthalene;
2,2 bis[p-dinitrile oxalate phenyl]-propane;
bis [p-dinitrile oxalate phenly] methane;
1-chloro-3,5-dinitrile oxalate benzene;
4-bromo-1, 3,5-trinitrile oxalate benzene;
3-hydroxy-1,4-dinitrile oxalate benzene, 3-nitro-1,4-dinitrile oxalate benzene;
1-carboxy-2,4-dinitrile oxalate benzene;
2,8-dinitrile oxalate anthracene;
2,4,8-trinitrile oxalate anthracene;
4,4'-biphenyl dinitrile oxalate;
2,2'-biphenyl dinitrile oxalate;
4,4'-diphenylethane-dinitrile oxalate;
2,2'-diphenylethane-dinitrile oxalate;
4,4'-stilbene-dinitrile oxalate;
2,2'-stilbene-dinitrile oxalate.

Illustrative of aromatic monohydroxamic acids suitable for use as the reactant in the preparation of the aromatic mononitrile oxalates of the invention are the following: benzohydroxamic acids, the hydroxamic acids of alkylated benzenes such as tolyhydroxamic acid, xylyl hydroxamic acid, trimethylbenzohydroxamic acid, ethylbenzo-hydroxamic acid, hexylbenzohydroxamic acid, nonylbenzohydroxamic acid, dodecylbenzohydroxamic acid, pentadecylbenzohydroxamic acid, tricosylbenzohydroxamic acid, naphthomonohydroxamic acids, such as 8-naphtholhydroxamic acid, cyclohexylbenzohydroxamic acid, tetrahydronaphthohydroxamic acid; 1-chloro-5-benzohydroxamic acid; 4-bromo-1-benzohydroxamic acid; 3-nitrobenzohydroxamic acid; anthracene monohydroxamic acids; biphenyl monohydroxamic acids, such as 1-phenyl-4-benzohydroxamic acid; 1 - benzyl-4-benzohydroxamic acid; 1-phenylethyl-4-benzohydroxamic acid, and the like.

Illustrative examples of aromatic mononitrile oxaltes of the invention include those corresponding to the foregoing hydroxamic acids such as benzonitrile oxalates, the mononitrile oxalates of alkylated benzenes, such as tolylnitrile oxalate, xylylnitrile oxalate, trimethylbenzonitrile oxalate, ethylbenzonitrile oxalate, hexylbenzonitrile oxalate, nonylbenzonitrile oxalate, dodecylbenzonitrile oxalate, pentadecylbenzonitrile oxalate, tricosylbenzonitrile oxalate, naphthomononitrile oxalates, such as 8-naphthonitrile oxalates, cyclohexylbenzonitrile oxalate, tetrahydronaphthonitrile oxalate; 1-chloro-4-benzonitrile oxalate; 4-bromo-1-benzonitrile oxalate; 3-nitrobenzonitrile oxalate; anthracine mononitrile oxalate, biphenylmononitrile oxalates such as 1-phenyl-4-benzonitrile oxalate; 1-benzyl-4-benzonitrile oxalate; 1-phenylethyl-4-benzonitrile oxalate, and the like.

Illustrative of aliphatic monohydroxamic acids suitable for use as the reactant in the preparation of the aliphatic mononitrile oxalates of the invention are the following: methylhydroxamic acid, ethylhydroxamic acid, propylhydroxamic acid, isopropylhydroxamic acid, butylhydroxamic acid, isobutylhydroxamic acid, pentylhydroxamic acid, 1-methyl-2-propylhexylhydroxamic acid, cyclohexylhydroxamic acid, 3,5-dimethylhexylhydroxamic acid, 2-methylbutylhydroxamic acid, n-nonylhydroxamic acid, Decalin hydroxamic acid, n-dodecylhydroxamic acid, 2-propyldodecylhydroxamic acid, n-heptadecylhydroxamic acid, n-pentadecylhydroxamic acid, stearylhydroxamic acid, heptadecylhydroxamic acid, tricosylhydroxamic acid, butenyl-3-hydroxamic acid, octenyl-7-hydroxamic acid, 2-ethyloctenyl-7-hydroxamic acid, 3,5-dimethyldecenylhydroxamic acid, n - dodecenyl - 11-hydroxamic acid, oleylhydroxamic acid cetene hydroxamic acid, eicosenehydroxamic acid, cerotenehydroxamic acid, melenehydroxamic acid, 4-chlorobutylhydroxamic acid, 3,5-dibromohexylhydroxamic acid, 8 - nitrooctylhydroxamic acid, 1,3-butadienehydroxamic acid and isoprenehydroxamic acid.

Illustrative examples of aliphatic mononitrile oxalates of the present invention include methyl mononitrile oxalate, ethyl mononitrile oxalates, isopropyl mononitrile oxalate, butyl mononitrile oxalate, isobutyl mononitrile oxalate, pentyl mononitrile oxalate, cyclohexyl monotrile oxalate, 3,5-dimethylhexyl mononitrile oxalate, 2-ethylbutyl mononitrile oxalate, Decalin mononitrile oxalate, n-nonyl mononitrile oxalate, n-dodecyl mononitrile oxalate, 2-propyldodecyl mononitrile oxalate, n-heptadecyl mononitrile oxalate, stearyl mononitrile oxalate, tricosyl mononitrile oxalate, butenyl mononitrile oxalate, octenyl mononitrile oxalate, 2 - ethyloctenyl mononitrile oxalate, 3,5-dimethyldecnyl mononitrile oxalate, dodecenyl mononitrile oxalate, oleyl mononitrile oxalate, cetene mononitrile oxalate, eicosene mononitrile oxalate, melene mononitrile oxalate, 4-chlorobutyl mononitrile oxalate, 8-nitrooctyl mononitrile oxalate, 3-butadiene mononitrile oxalate and isoprene mononitrile oxalate.

Illustrative of aliphatic polyhydroxamic acids suitable for use as the reactant in the preparation of the aliphatic polynitrile oxalates of the invention are the following: malodihydroxamic acid, succinodihydroxamic acid, glutarodihydroxamic acid, adipodihydroxamic acid, pimelodihydroxamic acid, suberodihydroxamic acid, azelodihydroxamic acid, sebacodihydroxamic acid, fumarodihydroxamic acid, itacodihydroxamic acid, allylmalodihydroxamic acid, cetylmalodihydroxamic acid; 1,6,9-decanetrihydroxamic acid; 1,3,6-haptanetrihydroxamic acid, cyclohexyldihydroxamic acid, 4 - bromo - 1,6-hexanedihydroxamic acid; 2-chloro-1,9-nonanedihydroxamic acid and the like.

Illustrative examples of aliphatic polynitrile oxalates of the invention include those corresponding to the foregoing hydroxamic acids such as malodinitrile oxalate, succinodinitrile oxalate, glutarodinitrile oxalate, adipodinitrile oxalate, pimelodinitrile oxalate, suberodinitrile oxalate, azelodinitrile oxalate, sebacodinitrile oxalate, fumarodinitrile oxalate, itacodinitrile oxalate, allylmalodinitrile oxalate, allylsuccinodinitrile oxalate, cetylmalodinitrile oxalate, 1,6,9-decanetrinitrile oxalate, 1,3,6-heptanetrinitrile oxalate, cyclohexyldinitrile oxalate, 4-bromo-1,6-hexanedinitrile oxalate, 2-chloro-1,9-nonanedinitrile oxalate, etc.

The temperature for effecting the reaction of the hydroxamic acid and oxalyl chloride may vary depending upon the particular hydroxamic acid selected but in all cases should be conducted below the decomposition temperature of the desired nitrile oxalate. Reflux temperatures can also be used as long as the reflux temperature of the particular mixture is below the decomposition temperature of the corresponding nitrile oxalate produced. The reaction temperature will often fall in the range of up to about 90° C., preferably up to about 50° C., when preparing aromatic nitrile oxalates, and often up to about 70° C., preferably up to about 30° C. when preparing aliphatic nitrile oxalates. The reaction can be successfully run at temperatures as low as about —30° C. Ordinarily the reaction will proceed readily at atmospheric pressure but sub- and superatmospheric pressure can be employed, if desired.

Either the hydroxamic acid reactant or the oxalyl chloride reactant can be in excess but it is preferred that at least a stoichiometric amount of oxalyl chloride be used, that is, a ratio of at least one mole of oxalyl chloride per hydroxamic acid substituent. A large excess of oxalyl chloride is particularly preferred and can be the sole solvent, if desired. The reaction can be conducted in the liquid phase and in many cases the hydroxamic acid will react from the solid state. Advantageously the hydroxamic acid is first dissolved or slurried in an oxygen-containing organic solvent. Illustrative of suitable oxygen-containing solvents are the oxalyl chloride reactant itself and normally liquid organic ethers, esters, furans, dioxanes and the like. The preferred solvent is the oxalyl chloride reactant, and excess of which will partially dissolve the hydroxamic acid.

The reaction is often over in less than about 0.5 hour, for example, 15 minutes or in about 5 to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid as the hydroxamic acid is dissolved. At the lower reaction temperatures the hydroxamic acid is generally slow to dissolve and may even come out of solution, go back into solution, etc., during the reaction.

The nitrile oxalate can be recovered from the resulting solution by any desirable means, for instance, by first filtering the resulting solution to remove any unreacted starting materials and subjecting the filtrate to reduced pressure to remove unreacted oxalyl chloride and inert solvent, if employed, and provide the nitrile oxalate as a crude product. Alternatively, prior to the filtering step, the solution can be cooled to crystallize out the product which is then recovered as described. The crude product which can be either crystalline or liquid depending on the particular nitrile oxalate prepared, contains small amounts of impurities high in chlorine content. A pure product, essentially chloride free, can be obtained by recrystallization techniques as, for instance, from a suitable solvent such as ether, pentane, dichloromethane, carbon disulfide, ethyl acetate, oxalyl chloride and the like and mixtures thereof.

A convenient alternative method for obtaining an essentially chlorine-free nitrile oxalate is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular nitrile oxalate feed selected. If desired, a combination of both the recrystallization and extraction methods can be used to obtain essentially chlorine-free nitrile oxalate. Thermal decomposition of the essentially chlorine-free feed in accordance with the method of the present invention results in improved yields of a purer isocyanate product, which is also essentially chlorine-free.

The following examples will serve to illustrate the present invention but are not to be construed as limiting.

EXAMPLE I

A mixture of 1.9 g. (.014 mole) of benzohydroxamic acid in 100 cc. ether and 10 cc. (large excess) of oxalyl chloride was refluxed for half an hour. The solution was filtered and the solvents removed under reduced pressure. There resulted 2.0 g. (74%) of benzonitrile oxalate, M.P. 123-126° C. dec. Recrystallization from an ether-pentane mixture gave white crystals, M.P. 126-127° C. dec.

The infrared spectrum of the material (Nujol mull) showed the typical nitrile oxalate peaks. A sample of the material was heated to decomposition in a test tube. The infrared spectrum of the resulting liquid (neat) showed the absence of nitrile oxalate peaks and the appearance of a strong isocyanate band.

EXAMPLE II

To 20 cc. (large excess) of oxalyl chloride was added in portions 1.0 g. (0.0061 mole) of p-vinyl-benzohydroxamic acid and the reaction mixture refluxed for five minutes. The resulting solution was filtered and set aside until the product crystallized from solution. There was obtained 0.80 g. (62%) of p-vinylbenzonitrile oxalate, M.P. 145–147° C. dec.

*Analysis.*—Calcd. for $C_{11}H_7NO_4$ (percent): C, 60.83; H, 3.25; N, 6.45; O, 29.47. Found (percent): C, 60.58; H, 3.42; N, 6.70.

The infrared spectrum of the product (Nujol mull) shows typical nitrile oxalate absorptions.

EXAMPLE III

A 250 ml. Erlenmeyer flask, equipped with stirrer, nitrogen inlet and a condenser, was charged with 9.8 g. (0.05 mole) of terephthalo dihydroxamic acid dispersed in 63.46 g. (0.5 mole) of oxalylchloride and stirred for 24 hours at room temperature. A provision was made to collect the evolved hydrochloric acid in a standardized (1.0 normal) sodium hydroxide solution to determine the progress of the reaction. After the stoichiometric amount of hydrochloride acid was collected the reaction was terminated, filtered and crude material recrystallized from a mixture of tetrahydrofuran and oxalyl chloride.

The p-phenylene dinitrile oxalate was characterized by I. R. analysis. The infrared spectrum of the product (Nujol mull) showed peaks at 5.45 and 5.61 which are characteristic for this type of oxalate absorption.

The decomposition point of p-phenylene dinitrile oxalate was observed at 148° C.

The m-phenylene dinitrile oxalate was prepared in the same manner and showed a decomposition point at 151° C.

EXAMPLE IV

Adipodi (nitrile oxalate) is prepared by reacting adipodihydroxamic acid and oxalyl chloride in accordance with the general procedure of Example III.

It is claimed:

1. A cyclic nitrile oxalate compound having the structure:

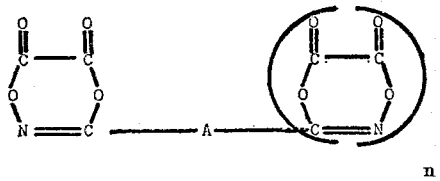

wherein A is saturated or monoolefinically-unsaturated aliphatic hydrocarbon of 1 to 30 carbon atoms and $n$ is an integer of 1 to 3.

2. A compound of claim 1 wherein $n$ is an integer of 1 to 2.

3. A cyclic nitrile oxalate compound having the structure:

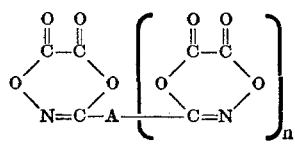

wherein A is aromatic hydrocarbon of 6 to 30 carbon atoms and 1 to 3 aromatic hydrocarbon rings and $n$ is an integer of 0 to 3, with the proviso that when $n$ is 1 or more no two cyclic nitrile oxalate substituents present on the same aromatic ring are in ortho position with respect to one another.

4. A compound of claim 3 wherein $n$ is 1 to 2 and at least two of the cyclic nitrile oxalate substituents are attached to aromatic rings of A.

5. A compound of claim 4 wherein A is of 6 to 12 carbon atoms.

6. A compound of claim 5 wherein $n$ is 1.

7. A compound of claim 3 wherein $n$ is 0 and the cyclic nitrile oxalate substituent is attached to an aromatic ring of A.

8. A compound of claim 7 wherein A contains one aromatic ring.

9. A compound of claim 8 wherein A is of 6 to 12 carbon atoms.

10. The compound of claim 3 wherein —A— is

11. The compound of claim 3 wherein —A— is

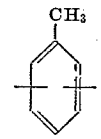

12. The compound of claim 3 wherein —A— is

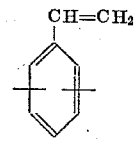

13. The compound of claim 3 wherein —A— is

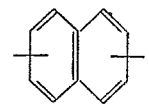

14. A cyclic nitrile oxalate compound having the structure:

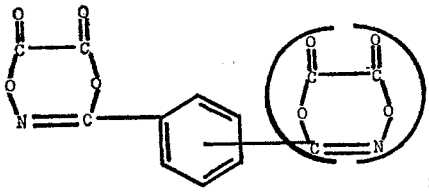

wherein $n$ is an integer of 0 to 2, with the proviso that when $n$ is 1 or more no two cyclic nitrile oxalate substituents are in ortho position with respect to one another.

15. The compound having the structure:

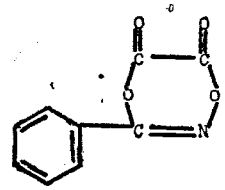

16. The compound having the structure:

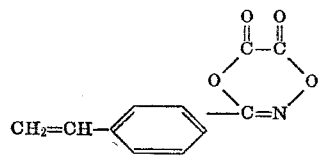

17. The compound having the structure:
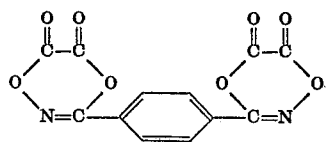
18. The compound having the structure:
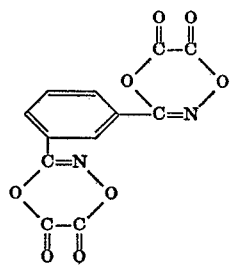
References Cited
Patterson et al.: The Ring Index, 2nd ed., p. 25 Wash. D.C., Amer. Chem. Soc., 1960.
NATALIE TROUSOF, Primary Examiner
U.S. Cl. X.R.
260—2.5 A, 66, 75 TN, 77.5 AP, 80 P, 80.3 N, 82.1, 85.5 B, 85.7, 88.1 P, 88.1 PA, 88.3 R, 240 E, 240 CA, 244 R, 453 A, 453 AR, 453 AL, 453 P, 500.5 H